3,223,657
RESINOUS COMPOSITION COMPRISING AN EPOXIDIZED ESTER OF A NEOPENTYL POLYHYDRIC ALCOHOL
Joseph Weisfeld, Orange, and William M. Kraft, Verona, N.J., assignors, by mesne assignments, to Tenneco Chemicals, Inc., a corporation of Delaware
No Drawing. Filed July 27, 1961, Ser. No. 127,118
10 Claims. (Cl. 260—18)

This invention relates to novel epoxy resin compositions. More particularly it relates to resinous compositions comprising an epoxidized ester of a neopentyl polyhydric alcohol, a polyglycidyl ether, and an acidic ester of a neopentyl polyhydric alcohol. In addition it relates to a method for the production of these resinous compositions. It further relates to the hard resinous products prepared from these compositions.

It is known that various polyglycidyl ethers can be reacted with polycarboxylic acids or with anhydrides of polycarboxylic acids to form products useful, for example, in electrical, pattern, tool, and die-works applications. Such compositions tend to be brittle, however, and cannot ordinarily be employed in those applications, such as maintenance paints, metal coatings, floor finishes, and the like, where durable, flexible products are required.

It has now been discovered that epoxy resins having excellent mechanical and chemical propertites can be obtained by combining low molecular weight polyglycidyl ethers with epoxidized esters of neopentyl polyhydric alcohols and acidic esters derived from neopentyl polyhydric alcohols and anhydrides of polycarboxylic acids and curing the resulting resinous compositions. These epoxy resins are characterized by outstanding hardness, adhesion, flexibility, and resistance to water, solvents, and alkalies. In addition these resins are light in color and do not yellow appreciably even on prolonged heating at elevated temperatures.

The novel three-component resinous compositions may be used as laminating resins, as adhesives, or as casting resins. They are of particular value, however, as surface-coating materials. These compositions, which have an extended pot life, may be sprayed or brushed onto surfaces and cured to form coatings that are hard, flexible, and resistant to impact, that have excellent color and color retention on exposure to heat and to ultra-violet radiation, and that are resistant to attack by water, by solvents, and by alkalies. They may be pigmented to form products useful as surface primers and in topcoat systems. The novel three-component compositions have the further advantage of being more economical to produce and to use than are most of the commercially-available surface-coating materials. In addition since their components are low in toxicity, these compositions may be prepared and applied without danger to the operating personnel.

In order to obtain cured products having the aforementioned combination of desirable properties, it is necessary that the resinous compositions contain (1) an epoxidized ester of a neopentyl polyhydric alcohol, (2) a low molecular weight polyglycidyl ether, and (3) an acidic ester derived from a neopentyl polyhydric alcohol and an anhydride of a polycarboxylic acid. The omission of the epoxidized ester from the composition or the substitution of another epoxidized ester, for example, an epoxidized vegetable oil, for the specified epoxidized ester results in surface-coating products that are brittle or that have inferior thermal properties and poorer resistance to water, solvents, and alkalies. Compositions that do not contain a low molecular weight polyglycidyl ether as hereinafter described generally cure slowly to form soft films that do not adhere well to metal surfaces, that have poor color stability, and that are not resistant to attack by water and by alkalies. The mixture of the epoxidized ester of the neopentyl polyhydric alcohol and the polyglycidyl ether must be heated with an acidic compound to form cured resinous products. Most of the acidic compounds previously used in the curing of epoxy resins, for example, phthalic anhydride, maleic anhydride, HET anhydride, and tetrahydrophthalic anhydride, are incompatible with the mixture of epoxide compounds and therefore cannot be used in these resinous compositions. The replacement of the acidic ester by one of the few acidic compounds that are compatible with the epoxide mixture, for example, 3,4-dimethyl-6-isobutenyltetrahydrophthalic anhydride, Methyl Nadic anhydride, dodecenylsuccinic anhydride, citric acid, or aconitic acid, usually has a deleterious effect on the properties of the cured film, and particularly on their hardness and their resistance to solvents and to alkalies. In addition compositions containing acidic compounds other than the hereinafter specified acidic esters undergo considerable yellowing on prolonged exposure to heat and/or to ultraviolet radiation, whereas little or no yellowing of the compositions of the present inventions takes place under these conditions.

The epoxidized esters that may be used in the preparation of the novel resinous compositions are those derived from monocarboxylic acid esters of neopentyl polyhydric alcohols containing from 3 to 8 hydroxyl groups per molecule, for example, pentaerythritol, dipentaerythritol, tripentaerythritol, trimethylolethane, trimethylolpropane, and trimethylolbutane. The useful epoxidized esters are those in which at least one of the hydroxyl groups of the neopentyl polyhdric alcohol has been replaced by an aliphatic monocarboxylic acid radical that contains from 4 to 22 carbon atoms and from 1 to 3 oxirane groups and any remaining hydroxyl groups have been replaced by radicals of saturated or unsaturated aliphatic monocarboxylic acids, by benzenoid monocarboxylic acids, or by mixtures of these radicals.

These epoxidized esters may be formed by converting to epoxy (oxirane) groups at least 70% of the ethylenic groups of an unsaturated ester of the neopentyl polyhydric alcohol. The unsaturated esters may be prepared by esterifying the neopentyl polyhydric alcohol with an amount of monocarboxylic acid that will react with substantially all of the hydroxyl groups of the polyhydric alcohol. If desired, a small excess of either the acid or the polyhydric alcohol may be used. The acids that may be reacted with the polyhydric alcohol to form these esters include the unsaturated straight-chain and branched-chain aliphatic monocarboxylic acids that contain from 4 to 22 carbon atoms and from one to three ethylenic groups. Illustrative of these acids are methacrylic acid, crotonic acid, allylacetic acid, angelic acid, tiglic acid, oleic acid, linoleic acid, linolenic acid, sorbic acid, erucic acid, and brassidic acid. Mixtures of two or more of these unsaturated monocarboxylic acids as well as mixtures of at least one of these acids with saturated aliphatic monocarboxylic acids containing 4 to 22 carbon atoms or benzenoids monocarboxylic acids may also be used. Among the acids that may be used in admixture with the unsaturated acids are butyric acid, caproic acid, 2-ethylhexanoic acid, caprylic acid, pelargonic acid, stearic acid, benzoic acid, chlorobenzoic acids, anisic acid, toluic acids, nitrobenzoic acids, and hydroxybenzoic acids. Such mixtures of saturated and unsaturated acids should contain an amount of the unsaturated acids that will react with at least one of the hydroxyl groups of the polyhydric alcohol. The preferred monocarboxylic acids are drying oil fatty acids and semi-drying oil fatty acids, such as soybean oil fatty acids, linseed oil fatty acids, dehydrated castor oil fatty acids, and tall oil fatty acids. Mixtures of drying oil fatty acids and semi-drying oil fatty acids may also be used.

Any of the well-known epoxidation procedures may be used to convert the unsaturated esters to the corresponding epoxidized esters. For example, the unsaturated esters may be reacted with hydrogen peroxide or with an organic per acid, such as performic acid, peracetic acid, perbutyric acid, perbenzoic acid, or perphthalic acid, at a temperature between approximately 10° C. and 80° C. until at least 70% of the ethylenic groups in the ester have been converted to oxirane groups. Alternatively, the unsaturated acid may be epoxidized with hydrogen peroxide or with an organic per acid prior to its esterification with the neopentyl polyhydric alcohol.

The epoxidized esters that are used in the practice of the present invention ordinarily have oxirane contents in the range of approximately 4.0% to 8.0%. The preferred esters are epoxidized pentaerythritol tetraesters of drying oil fatty acids, semi-drying oil fatty acids, or mixtures of these acids that have oxirane contents in the range of 4.7% to 7.5%. Particularly preferred are epoxidized pentaerythritol tetraesters of tall oil fatty acids that have oxirane contents in the range of 5.2% to 7.3%. In each case the maximum oxirane content possible, that is, the oxirane content of the ester in which all of the ethylenic groups have been converted to oxirane groups, is dependent upon the molecular weight of the ester and the degree of unsaturation of the acids used in its preparation. The preparation and properties of these epoxidized esters are described in copending patent application Serial No. 784,057, which was filed by William M. Kraft and James P. Scullin on December 3, 1958, now abandoned.

The polyglycidyl ethers that may be present in the novel compositions are low molecular weight compounds that are liquids or low melting solids at room temperature and that are compatible with the aforementioned epoxidized esters. These polyglycidyl ethers, which are the products of the condensation of a halohydrin with a polyhydric alcohol or a polyhydric phenol, contain an average of 1.0 to 3.0 and preferably an average of 1.2 to 2.0 oxirane groups per molecule. A preferred group of polyglycidyl ethers are the condensation products of epichlorohydrin and 2,2-bis(4-hydroxyphenyl)propane that have epoxide equivalent weights below approximately 800, the epoxide equivalent weight being the average weight of the polyglycidyl ether that contains one oxirane group. Typical of these polyglycidyl ethers are Epon 828, a liquid ether having an epoxide equivalent weight of 185 to 205, and Epon 836, a low melting ether having an epoxide equivalent weight of 280 to 350. A second preferred group of polyglycidyl ethers are low molecular weight ethers derived from terpene-phenol condensation products. These polyglycidyl ethers, which are ordinarily derived from a p-menthadiene or a terpene that may be converted to a p-menthadiene during the course of the reaction, for example, dipentene, limonene, or α-pinene, preferably have hydroxyl contents of approximately 2.5% to 4.8%, oxirane contents of approximately 1.5% to 2.7%, and combined hydroxyl contents and oxirane contents of approximately 4.5% to 7.0%. Their epoxide equivalent weights are generally in the range of 300 to 900. The preparation and properties of these polyglycidyl ethers are described in copending patent application Serial No. 107,309, which was filed by William M. Kraft and Roy T. Gottesman on May 3, 1961.

The third component of the novel resinous compositions is an acidic ester that is derived from a neopentyl polyhydric alcohol and an anhydride of a polycarboxylic acid. These acidic esters may be represented by the formula

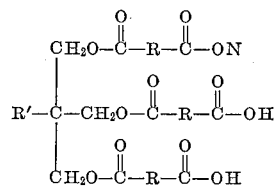

In this formula each R represents the hydrocarbyl or substituted hydrocarbyl residue of a polycarboxylic acid, and R' represents an alkyl group containing from 1 to 3 carbon atoms

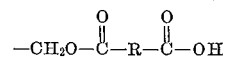

or

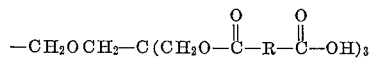

The neopentyl polyhydric alcohols that may be used in the preparation of the acidic esters are those that contain from 3 to 6 hydroxyl groups per molecule. These include trimethylolethane, trimethylolpropane, trimethylolbutane, pentaerythritol, and dipentaerythritol. Also included are those derivatives of pentaerythritol and dipentaerythritol that contain at least 3 hydroxyl groups. Illustrative of these derivatives are hydroxyalkyl ethers, partial esters, ethers, halides, amines, and the like. Specific examples of these derivatives are pentaerythritol monochloride, pentaerythritol monoamine, pentaerythritol monostearate, pentaerythritol monomethyl ether, pentaerythritol hydroxyethyl ethers, pentaerythritol hydroxypropyl ethers, dipentaerythritol tricaproate, dipentaerythritol dilaurate, dipentaerythritol monostearate, dipentaerythritol tributyl ether, dipentaerythritol diphenyl ether, dipentaerythritol hydroxyethyl ethers, and dipentaerythritol hydroxypropyl ethers. Mixtures of these neopentyl polyhydric alcohols may also be used.

A wide variety of anhydrides of polycarboxylic acids may be used in the separation of the acidic esters. These include anhydrides of saturated and unsaturated aliphatic polycarboxylic acids as well as anhydrides of aromatic and cycloaliphatic polycarboxylic acids. The polycarboxylic acids from which the anhydrides are derived may contain from 2 to 4 carboxyl groups. Illustrative of these are the following anhydrides: succinic anhydride, glutaric anhydride, dodecenylsuccinic anhydride, citraconic anhydride, itaconic anhydride, maleic anhydride, chloromaleic anhydride, phthalic anhydride, tetrahydrophthalic anhydride, hexahydrophthalic anhydride, hexachloroendomethylenetetrahydrophthalic anhydride, 3,4-dimethyl-6-isobutenyltetrahydrophthalic anhydride, 3,4-dimethyl-6-isobutylhexahydrophthalic anhydride, trimellitic anhydride, and maleic anhydride adducts of cyclopentadiene, methylcyclopentadiene, and other unsaturated hydrocarbons. A single anhydride or a mixture of two or more anhydrides may be used in the preparation of the acidic esters. The preferred acidic esters are pentaerythritol tetra(acid phthalate), pentaerythritol tetra(acid hexachloroendomethylenetetrahydrophthalate), and mixtures of these acidic esters.

The properties of the acidic esters may be modified by replacing a minor portion of the polyhydric alcohol with a monohydric alcohol, such as an alkanol containing from 6 to 20 carbon atoms, or by replacing a minor portion of the anhydride with a monocarboxylic acid, such as oleic acid, pelargonic acid, tall oil fatty acids, or benzoic acid.

The acidic esters may be prepared by heating the neopentyl polyhdric alcohol with the anhydride in the amounts of approximately 0.7 to 1.2 moles and preferably approximately 1.0 mole of the anhydride per hydroxyl equivalent of the polyhydric alcohol. Thus approximately 2.1 to 3.6 moles of thte anhydride is used per mole of a trihydric alcohol, approximately 2.8 to 4.8 moles of the anhydride is used per mole of a tetrahydric alcohol, and approximately 4.2 to 7.2 moles of anhydride is used per mole of a hexahydric alcohol. The preferred amounts of anhydride are approximately 3 moles per mole of trihydric alcohol, 4 moles per mole of tetrahydric alcohol, and 6 moles per mole of hexahydric alcohol. The acidic esters prepared from these amounts of the reactants contain approximately 0.7 to 1.2 carboxyl groups and preferably 1.0 carboxyl group for each ester linkage.

The esterification reaction is carried out under conditions that will allow the hydroxyl groups of the polyhydric alcohol to react with the anhydride groups to form ester linkages and carboxyl groups (see Equation A) but will not allow the resulting carboxyl groups to be esterified thereby forming a polyester (see Equation B).

EQUATION A.—FORMATION OF AN ACIDIC ESTER OF PENTAERYTHRITOL

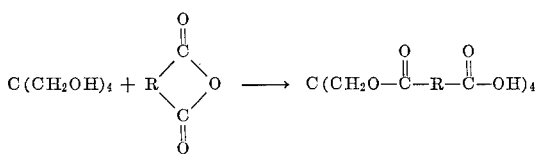

EQUATION B.—FORMATION OF A PENTAERYTHRITOL POLYESTER

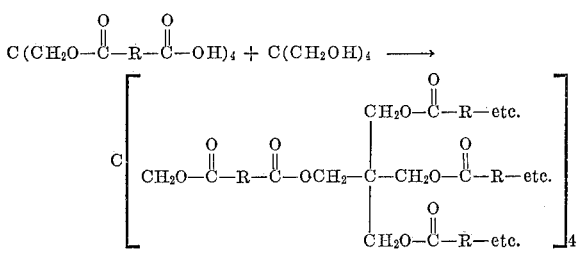

In each of these equations R represents the hydrocarbyl or substituted hydrocarbyl residue of one of the aforementioned polycarboxylic acids.

The preferred products of this reaction are those that contain a maximum amount of the acidic ester and little or no polyester. Unlike products containing substantial amounts of polyesters, the preferred products are readily soluble in a variety of solvents including hydrocarbons, ketones, alcohols, and ethers, and the resulting solutions are miscible at room temperature with the other components of the resinous compositions. In addition the functionality of the preferred products is greater than that of the polyester-containing products, that is, a smaller amount of the preferred products is required to provide an equivalent number of carboxyl groups.

To obtain products that contain a maximum amount of the acidic ester and substantially no polyester, the reaction is ordinarily carried out at a temperature between 100° C. and 150° C. and preferably between 120° C. and 140° C. If the reaction is carried out at subatmospheric pressures, lower temperatures may be employed. Reaction of the polyhydric alcohol with the anhydride at temperatures above approximately 150° C. generally yields products that contain substantial amounts of polyester. The esterification is ordinarily carried out in an atmosphere of an inert gas, such as nitrogen, or in the presence of a solvent in which the acidic ester is soluble, for example, xylene, methyl isobutylketone, amyl alcohol, or ethylene glycol monoethyl ether. The reaction is continued until all of the anhydride has reacted with the polyhydric alcohol to form a product having approximately equal numbers of ester linkages and carboxyl groups. Any of the well-known analytical procedures for the determination of anhydrides in the presence of carboxylic acids may be used to indicate the completion of the reaction, that is, the point at which the reaction mixture contains substantially no anhydride and a maximum number of carboxyl groups. The acidic esters generally have acid numbers in the range of approximately 120 to 500 with the value in each case being largely dependent upon the choice of reactants.

The relative amounts of the aforementioned three components used in the preparation of the resinous products have an appreciable effect on their properties. Compositions suitable for use in a variety of casting and surface-coating applications may contain from approximately 0.5 to 1.5 equivalents of the acidic ester per epoxide equivalent of the epoxidized ester and the polyglycidyl ether. Products ordinarily having the best combination of properties, namely, excellent flexibility, impact strength, adhesion, and hardness and maximum resistance to water, solvent, and alkalies, are those in which the amount of the acidic ester used is substantially that required to provide one carboxyl group for each of the oxirane groups of the epoxidized ester and the polyglycidyl ether. Such products contain 1.0 equivalent of the acidic ester per epoxide equivalent of the epoxidized ester and the polyglycidyl ether.

The properties of the cured resinous products are also dependent upon the relative amounts of the epoxidized ester and the polyglycidyl esther that are present. For example, rather soft, flexible products are obtained when 4 or more parts by weight of the epoxidized ester is used per part by weight of the polyglycidyl ether, whereas relatively hard, brittle products result when less than 1 part by weight of the ester is used per part by weight of the polyglycidyl ether. Compositions containing approximately 0.1 to 10 parts by weight of the epoxidized ester per part by weight of the polyglycidyl ether have proven useful in a number of applications. Compositions that are useful as surface-coating materials ordinarily contain from 1 to 10 parts by weight of the epoxidized ester per part by weight of the polyglycidyl ethers. The preferred compositions are those containing approximately 1.5 to 3 parts by weight of the epoxidized ester per part by weight of the polyglycidyl ether. Such compositions can be cured to form resinous products that are characterized by excellent color and color retention, adhesion, hardness, flexibility, and resistance to water, solvents, and alkalies.

The resinous compositions of the present invention may be prepared by simply stirring the aforementioned components together at a temperature below approximately 50° C. until a homogeneous mixture is obtained. Higher temperatures are avoided since they may lead to the premature curing of the composition. When one or more of the components are solids or viscous liquids, a solvent may be added to facilitate mixing. Alternatively, one or more of the components may be dissolved in a solvent prior to the mixing step.

In the preferred embodiment of the invention, the epoxidixed ester is first mixed with the polyglycidyl ether to form an epoxide mixture than contains approximately 50% to 90% by weight of the ester and 10% to 50% by weight of the ether, and preferably 60% to 75% by weight of the ester and 25% to 40% by weight of the ether. These epoxide mixtures are stable at ordinary temperatures for prolonged periods; that is, they may be stored at room temperature for several months without undergoing appreciable increase in viscosity or other indication of spontaneous curing. To this epoxide mixture is added a solution containing approximately 20% to 90% by weight and preferably 35% to 60% by weight of the acidic ester. Any liquid solvent in which the acidic ester is soluble may be used in the preparation of the solution. Such solvents include, for example, aliphatic hydrocarbons, aromatic hydrocarbons, alcohols, ketones, ethers, and esters. Illustrative of specific solvents that may be used are toluene, xylene, acetone, methyl ethyl ketone, methyl isobutyl ketone, butyl alcohol, amyl alcohol, ethylene glycol monoethyl ether (Cellosolve), ethylene glycol monoethyl ether acetate (Cellosolve acetate), and butyl acetate. Mixtures of solvents may also be used. The preferred solvent for the acidic esters is a mixture that contains equal weights of xylene, methyl isobutyl ketone, and Cellosolve.

Resinous compositions prepared by the preferred procedure generally contain approximately 15% to 40% by weight of the epoxidized ester, 5% to 30% by weight of the polyglycidyl ether, 20% to 50% by weight of the acidic ester, and 10% to 50% by weight of the solvent. The preferred compositions contain approximately 20% to 30% by weight of the epoxidized ester, 10% to 20% by weight of the polyglycidyl ether, 25% to 45% by weight of the acidic ester, and 20% to 40% by weight of the solvent.

The resinous compositions, which contain the epoxidized ester, the polyglycidyl ether, the acidic ester, and optionally a solvent, are stable at room temperature for a period of several weeks or more. They may be cured by heating them at a temperature between approximately 80° C. and 300° C. and preferably between 120° C. and 180° C. until a hard resinous product is obtained. No catalyst is required in the curing step. Surface-coating compositions having an excellent combination of properties may be obtained by forming films approximately 1 to 10 mils in thickness and curing the films at approximately 145° C. to 155° C. for periods ranging from 10 minutes to 90 minutes. Castings and laminated products are ordinarily cured for longer periods of time with the curing time in each case largely dependent upon the thickness of the product.

At any stage prior to the curing step, the resinous compositions or any of their components may be mixed with fillers, pigments, dyes, plasticizers, and the like in the amounts ordinarily employed for the purposes specified.

This invention is further illustrated by the examples that follow. It is to be understood, however, that these examples are given solely for the purpose of illustration and that the invention is not to be regarded as limited to any of the specific materials or conditions recited therein except as set forth in the appended claims.

EXAMPLE 1

An epoxide mixture was prepared by mixing together 25 parts by weight of an epoxidized tall oil fatty acids tetraester of pentaerythritol which had an oxirane content of 5.46% and 15 grams of Epon 828. To this epoxide mixture was added 61.8 parts by weight of a 50% solution of pentaerythritol tetra (acid phthalate) in a solvent mixture containing equal weights of xylene, methyl isobutyl ketone, and Cellosolve. The resulting composition was a clear, pale yellow solution which contained 71% resin solids and which had a Gardner-Holdt viscosity at 25° C. of G. This resinous composition had a shell life at room temperature of more than 3 weeks.

Films of this composition were cured at 150° C. for 1 hour and then evaluated by standard test methods. The results obtained are given in Table I.

Table I

Composition: Product of Ex. 1
Sward hardness—
  1 day _____ 82.
  14 days _____ 80.
Flexibility (⅛″ mandrel) _____ Pass.
Reverse impact (pounds) _____ Pass, 160.
Resistance to boiling water (1½ hours) _____ No effect.
Resistance to 20% NaOH (effect after 16 days) _____ Slight effect.
Resistance to MIBK (effect after 16 days) _____ No effect.
Resistance to 1% Tide solution (70° C.) (effect after 16 days) __ V. sl. effect.
Resistance to gasoline (effect after 16 days) _____ No effect.
Resistance to 20% salt spray (300 hours) _____ Excellent.
Adhesion _____ Excellent.
Color retention (percent increase in yellowness after 20 hrs. at 150° C.) _____ −11.

From the data in Table I it will be seen that the product of Example 1 has excellent hardness, flexibility, color retention, adhesion, and resistance to water, salt spray, alkalies, and solvents.

EXAMPLE 2

Resinous compositions were prepared by forming an epoxide mixture containing an epoxidized tall oil fatty acids tetraester of pentaerythritol which had an oxirane content of 5.23% and a condensation product of epichlorohydrin and 2,2-bis(4-hydroxyphenyl) propane that has an epoxide equivalent weight of 185 to 205 and that is marketed as Epon 828 and adding to the epoxide mixture a 50% solution of pentaerythritol tetra(acid phthalate) in a solvent mixture containing equal weights of xylene, methyl isobutyl ketone, and Cellosolve. In this series of compositions the relative amounts of the epoxidized ester and Epon 828 were varied; in each case the amount of pentaerythritol tetra(acid phthalate) added was that required to provide one carboxyl group for each oxirane group in the epoxide mixture.

Films of the compositions were cured at 150° C. for 1 hour and then evaluated by standard test methods. The results obtained are included in Table II.

Table II

| Composition | 2-A | 2-B | 2-C | 2-D | 2-E | 2-F |
|---|---|---|---|---|---|---|
| Ingredients (Grams): | | | | | | |
| Epoxidized Ester | 20 | 25 | 30 | 40 | 50 | 100. |
| Epon 828 | 20 | 15 | 10 | 10 | 10 | 10. |
| Pentaerythritol tetra (acid phthalate) solution | 64.5 | 62 | 59.4 | 72.8 | 84.4 | 150.3. |
| Gardner-Holdt Viscosity | F | G | F-G | E-F | E-F | E-F. |
| Properties of Cured Films: | | | | | | |
| Sward Hardness | 68 | 82 | 76 | 80 | 80 | 58. |
| Flexibility (⅛″ mandrel) | Pass | Pass | Pass | Pass | Pass | Pass. |
| Reverse Impact (160 lbs.) | Pass | Pass | Pass | Pass | Pass | Pass. |
| Adhesion | Excellent | Excellent | Excellent | Excellent | Excellent | Excellent. |
| Resistance to Boiling Water (1½ Hrs.) | No effect | No effect | No effect | No effect | No effect | No effect. |
| Resistance to 20% NaOH (Days to Denude) | 11 | 28 | 18 | 7 | 7 | 4. |
| Resistance to 1% Tide Solution (70° C.) (Days to Denude) | 5 | 20 | 10 | 4 | 2 | 2. |
| Resistance to 20% Salt Spray | Excellent | Excellent | Excellent | Excellent | Excellent | Good. |

EXAMPLE 3

Resinous compositions were prepared by forming an epoxide mixture containing an opoxidized tall oil fatty acids tetraester of pentaerythritol which had an oxirane content of 5.49% and a condensation product of epichlorohydrin and 2,2-bis(4-hydroxyphenyl) propane that has an epoxide equivalent weight of 185 to 205 and that is marketed as Epon 828 and adding to the epoxide mixture a 50% solution of pentaerythritol tetra(acid phthalate) in a solvent mixture containing equal weights of xylene, methyl isobutyl ketone, and Cellosolve. In this series of compositions the epoxide mixture contained 62.5% of the epoxidized ester and 37.5% of Epon 828.

a dipentene-phenol condensation product. This polyglycidyl ether had an oxirane content of 1.98% and a hydroxyl content of 3.7%. Also used was a chain-extended polyglycidyl ether (oxirane content, 0.7%) which was obtained by reacting with dimerized linoleic acid a polyglycidyl ether derived from a dipentene-phenol condensation product. The process by which such ethers are prepared is described in copending patent application Serial No. 110,876, which was filed by William M. Kraft and Edward G. Janusz on May 18, 1961.

Films of the compositions were cured at 150° C. for 1 hour and then evaluated by standard test methods. The results obtained are included in Table IV.

*Table IV*

| Composition | 4-A | 4-B | 4-C | 4-D |
|---|---|---|---|---|
| Ingredients (Grams): | | | | |
| Epoxidized Ester | 25 | 30 | 25 | 30. |
| Polyglycidyl Ether | 15 | 10 | | |
| Chain-extended Polyglycidyl Ether | | | 15 | 10. |
| Pentaerythritol tetra (acid phthalate) solution | 47.7 | 46.6 | 43.3 | 43.3. |
| Properties of Crude Films: | | | | |
| Flexibility (⅛″ mandrel) | Pass | Pass | Pass | Pass. |
| Reverse Impact (lbs.) | Pass 5 | Pass 100 | Pass 5 | Pass 130. |
| Resistance to Boiling Water (1½ Hrs.) | No effect | V. sl. effect | No effect | Slight effect. |
| Resistance to 20% NaOH (Days to Denude) | 17 | 17 | 13 | 17. |
| Resistance to 1% Tide (70° C.) (Days to Denude) | 6 | 6 | 6 | 6. |
| Resistance to 20% Salt Spray | Fair | Fair | Fair | Fair. |

The amount of pentaerythritol tetra(acid phthalate) solution added was varied to provide compositions that contained from 0.5 to 2.0 carboxyl groups per epoxide equivalent of the epoxide mixture.

Films of the compositions were cured at 150° C. for 1 hour and then evaluated by standard test methods. The results obtained are included in Table III.

EXAMPLE 5

A series of acidic esters was prepared by heating a neopentyl polyhydric alcohol with an anhydride of a polycarboxylic acid at a temperature between 125° C. and 140° C. and in an atmosphere of nitrogen. At regu-

*Table III*

| Composition | 3-A | 3-B | 3-C | 3-D | 3-E |
|---|---|---|---|---|---|
| Ingredients (Grams): | | | | | |
| Epoxidized Ester | 25 | 25 | 25 | 25 | 25. |
| Epon 828 | 15 | 15 | 15 | 15 | 15. |
| Pentaerythritol tetra (acid phthalate) solution | 30.7 | 55.8 | 61.5 | 92.8 | 123. |
| Carboxyl Equivalents per Epoxide Equivalent | 0.5 | 0.9 | 1.0 | 1.5 | 2.0. |
| Properties of Cured Films: | | | | | |
| Sward Hardness | 62 | 72 | 82 | 56 | 42. |
| Flexibility (⅛″ mandrel) | Pass | Pass | Pass | Pass | Fail. |
| Reverse Impact (lbs.) | Pass 160 | Pass 160 | Pass 160 | Pass 5 | Fail. |
| Adhesion | Excellent | Excellent | Excellent | Excellent | Good. |
| Resistance to Boiling Water (1½ Hrs.) | No effect | No effect | No effect | Sl. effect | Considerable effects. |
| Resistance to 20% NaOH (Days to Denude) | 3 | 14 | 28 | 3 | 3. |
| Resistance to 1% Tide (70° C.) (Days to Denude) | 3 | 8 | 20 | 3 | 1. |
| Resistance to 20% Salt Spray | Good | Excellent | Excellent | Fair | Fail. |

EXAMPLE 4

Resinous compositions were prepared by forming an epoxide mixture contaning an epoxidized tall oil fatty acids tetraester of pentaerythritol having an oxirane content of 5.46% and a polyglycidyl ether derived from a terpene-phenol condensation product and adding to the epoxide mixture a 50% solution of pentaerythritol tetra (acid phthalate) in a solvent mixture containing equal weights of xylene, methyl isobutyl ketone, and Cellosolve. Two terpenephenol polyglycidyl ethers were used in these compositions. One was a polyglycidyl ether derived from lar intervals throughout the reaction samples were removed from the reaction mixture. The anhydride contents of these samples were determined by measuring their acidity in solution in an alcohol-free solvent, such as pyridine or acetone, as well as in methanol or ethanol solution, with the difference in the acidity measurements serving as an indication of the anhydride content of the sample. The heating was discontinued as soon as all of the anhydride had been reacted. The acidic esters prepared are listed in Table V.

Table V

| Acidic Ester | Reactants | | Moles Anhydride Per Mole of Polyhydric Alcohol |
| --- | --- | --- | --- |
| | Polyhydric Alcohol | Anhydride | |
| 5-A | Pentaerythritol | Phthalic | 4 |
| 5-B | do | do | 3.5 |
| 5-C | do | do | 3 |
| 5-D | do | Maleic | 4 |
| 5-E | do | {Maleic / Phthalic} | 2 / 2 |
| 5-F | do | {Maleic / Phthalic} | 3 / 1 |
| 5-G | do | Tetrahydrophthalic | 4 |
| 5-H | do | {Phthalic / Succinic} | 3 / 1 |
| 5-I | do | 3,4-dimethyl-6-isobutenyl-tetrahydrophthalic | 4 |
| 5-J | do | HET* | 4 |
| 5-K | Trimethylolethane | Phthalic | 3 |
| 5-L | Trimethylolpropane | do | 3 |

*Hexachloroendomethylenetetrahydrophthalic anhydride is marketed as HET Anhydride.

EXAMPLE 6

Resinous compositions were prepared by forming epoxide mixtures containing an epoxidized tall oil fatty acids tetraester of pentaerythritol that had an oxirane content of 5.5% and a condensation product of epichlorohydrin and 2,2-bis(4-hydroxyphenyl)propane that has an epoxide equivalent weight of 185 to 205 and that is marketed as Epon 828 and adding to the epoxide mixtures solutions containing the acidic esters whose preparation was described in Example 5. Films of these compositions were cured at 150° C. for 1 hour and evaluated by standard test methods. The results obtained are given in Table VI.

EXAMPLE 7

A resinous composition was prepared by adding to an epoxide mixture containing 25 grams of an epoxidized tall oil fatty acids tetraester of pentaerythritol that had an oxirane content of 5.5% and 15 grams of a condensation product of epichlorohydrin and 2,2-bis(4-hydroxyphenyl) propane that has an expoxide equivalent weight of 185 to 205 and that is marketed as Epon 828, 61.9 grams of a 50% solution of pentaerythritol tetra(acid phthalate) in a solvent mixture containing equal weights of xylene, methyl isobutyl ketone, and Cellosolve. Films of the composition were cured at various temperatures

Table VI

| Composition | 6-A | 6-B | 6-C | 2-D | 6-E | 6-F |
| --- | --- | --- | --- | --- | --- | --- |
| Ingredients (Grams): | | | | | | |
| Epoxidized Ester | 25 | 25 | 25 | 25 | 25 | 25. |
| Epon 828 | 15 | 15 | 15 | 15 | 15 | 15. |
| Acidic Ester | 5-A 31 | 5-B 30.3 | 5-C 32.8 | 5-D 22.5 | 5-E 26.7 | 5-F 27. |
| Solvent | Xylene-10 MIBK-10 Cellosolve-10. | Xylene-10 MIBK-10 Cellosolve-10. | Xylene-11 MIBK-11 Cellosolve-11. | Butyl Cellosolve-22.5. | Xylene-9 MIBK-9 Cellosolve-9. | Xylene-9 MIBK-9 Cellosolve-9. |
| Viscosity (Gardner-Holdt) | G | P | G-H | T | L | |
| Properties of Cured Films: | | | | | | |
| Sward Hardness | 82 | 40 | 80 | 32 | 70 | 72. |
| Flexibility (⅛″ mandrel) | Pass | Pass | Pass | Pass | Pass | Pass. |
| Reverse Impact (pounds) | Pass 160 | Pass 160 | Pass 160 | Pass 160 | Pass 160 | Pass 160. |
| Resistance to Boiling Water (1½ Hrs.) | No effect | Slight effect | V. sl. effect | Cons. effect | No effect | V. sl. effect. |
| Resistance to 20% NaOH (Days to Denude) | 17 | 7 | 8 | 16 | 3 | 5. |
| Resistance to 20% Salt Spray | Excellent | Excellent | Excellent | Fair | Good | Good. |
| Adhesion | do | do | do | Excellent | Excellent | Excellent. |

| Composition | 6-G | 6-H | 6-I | 6-J | 6-K | 6-L |
| --- | --- | --- | --- | --- | --- | --- |
| Ingredients (Grams): | | | | | | |
| Epoxidized Ester | 25 | 25 | 25 | 25 | 25 | 25. |
| Epon 828 | 15 | 15 | 15 | 15 | 15 | 15. |
| Acidic Ester | 5-G 31.7 | 5-H 27.6 | 5-I 46 | 5-J 65 | 5-K 32 | 5-L 32.8 |
| Solvent | Xylene-11 MIBK-11 Cellosolve-11. | Xylene-9 MIBK-19 Cellosolve-9. | Xylene-46 | Xylene-65 | Xylene-11 MIBK-11 Cellosolve-11. | Xylene-11 MIBK-11 Cellosolve-11. |
| Viscosity (Gardner-Holdt) | M | B | D | T-U | D-E | E. |
| Properties of Cured Films: | | | | | | |
| Sward Hardness | 52 | 32 | 34 | 62 | 68 | 58. |
| Flexibility (⅛″ mandrel) | Pass | Pass | Fail | Pass | Fail | Pass. |
| Reverse Impact (pounds) | Pass 160 | Pass 160 | Fail | Pass 160 | Pass 150 | Pass 20. |
| Resistance to Boiling Water (1½ Hrs.) | V. sl. effect | Slight effect | Cons. effect | No effect | No effect | No effect. |
| Resistance to 20% NaOH (Days to Denude) | 3 | 19 | 0.3 | 3 | 14 | 7. |
| Resistance to 20% Salt Spray | Good | Good | Good | Excellent | Good | Good. |
| Adhesion | Excellent | Excellent | Excellent | do | Excellent | Excellent. | and then evaluated. The results obtained are given in Table VII.

*Table VII*

| Composition | Curing Cycle | | Sward Hardness (1 Day) | Flexibility (⅛" Mandrel) | Adhesion | Resistance to 20% NaOH at 70° C. (Hours to Denude) | Resistance to 1% Tide at 70° C. (Days to to Denude) |
|---|---|---|---|---|---|---|---|
| | Temp. (° C.) | Time (Min.) | | | | | |
| 7-A | 150 | 30 | 50 | Pass | Excellent | 3 | 6 |
| 7-B | 150 | 60 | 88 | ___do___ | ___do___ | 5.5 | 20 |
| 7-C | 200 | 15 | 54 | ___do___ | ___do___ | 4.5 | 6 |
| 7-D | 260 | 5 | 52 | ___do___ | ___do___ | 3 | 5 |
| 7-E | 260 | 10 | 62 | ___do___ | ___do___ | 4.5 | 5 |

EXAMPLE 8

To an epoxide mixture containing 25 grams of an epoxidized tall oil fatty acids tetraester of pentaerythritol that had an oxirane content of 5.49% and 15 grams of a condensation product of epichlorohydrin and 2,2-bis-(4-hydroxyphenyl) propane that has an epoxide equivalent weight of 185 to 205 and that is marketed as Epon 828 was added 31 grams of pentaerythritol tetra(acid phthalate). The resulting resinous composition was placed in a mold and heated at 145°–150° C. for 16 hours. The resulting cured resin had a heat distortion temperature of 46° C.

EXAMPLE 9

A white enamel was prepared by grinding a mixture of 30 parts by weight of titanium dioxide, 17.8 parts by weight of an epoxidized tall oil fatty acids tetraester of pentaerythritol, which had an oxirane content of 5.4%, 10.7 parts by weight of a condensation product of epichlorohydrin and 2,2-bis(4-hydroxyphenyl) propane that has an epoxide equivalent weight of 185 to 205 and that is marketed as Epon 828, 13 parts by weight of xylene, and 1 part by weight of a dispersing agent (Nuosperse 657) overnight in a pebble mill to a 7–8 Hegeman grind and then adding to the mixture 43 parts by weight of a 50% solution of pentaerythritol tetra(acid phthalate) in a solvent mixture containing equal weights of xylene, methyl isobutyl ketone, and Cellosolve. Films of this enamel were baked at 150° C. for 1 hour. The resulting cured films were hard and flexible and had excellent gloss.

What is claimed is:

1. The resinous composition comprising (a) an epoxidized ester of a neopentyl polyhydric alcohol containing from 3 to 8 hydroxyl groups per molecule and monocarboxylic acid wherein each of the hydroxyl groups of said neopentyl polyhydric alcohol has been replaced by the acid radical of said monocarboxylic acid, one of said monocarboxylic acid radicals being an aliphatic monocarboxylic acid radical containing 4 to 22 carbon atoms and from 1 to 3 oxirane groups and the remainder of said monocarboxylic acid radicals being members selected from the group consisting of aliphatic monocarboxylic acid radicals containing from 4 to 22 carbon atoms and from 1 to 3 oxirane groups, aliphatic monocarboxylic acid radicals containing from 4 to 22 carbon atoms, benzenoid monocarboxylic acid radicals, and mixtures thereof, said epoxidized ester having an oxirane content of approximately 4.0% to 8.0%; (b) a low molecular weight polyglycidyl ether that is the product of the condensation of epichlorohydrin with a polyhydric compound selected from the group consisting of polyhydric alcohols and polyhydric phenols, said ether having an average of 1.0 to 3.0 oxirane groups per molecule; and (c) an acidic ester that is the product of the reaction of a neopentyl polyhydric alcohol containing 3 to 6 hydroxyl groups with an anhydride of a polycarboxylic acid containing from 2 to 4 carboxyl groups, said acidic ester containing approximately 0.7 to 1.2 carboxyl groups for each ester linkage, said composition containing approximately 0.5 to 1.5 equivalents of said acidic ester for each epoxide equivalent of said epoxidized ester and said polyglycidyl ether.

2. The resinous composition comprising (a) 15% to 40% by weight of an epoxidized tall oil fatty acids tetraester of pentaerythritol, said ester having an oxirane content of 5.2% to 7.3%; (b) 5% to 30% by weight of a low molecular weight polyglycidyl ether which is the product of the condensation of epichlorohydrin with a polyhydric compound selected from the group consisting of polyhydric alcohols and polyhydric phenols, said ether having an average of 1.2 to 2.0 oxirane groups per molecule; (c) 20% to 50% by weight of an acidic ester that is the product of the reaction of pentaerythritol with an anhydride of a polycarboxylic acid containing from 2 to 4 carboxyl groups, said acidic ester containing approximately 0.7 to 1.2 carboxyl groups for each ester linkage; and (d) 10% to 50% by weight of a solvent for said acidic ester.

3. The cured resin that is the product obtained by heating at a temperature between 80° C. to 300° C. a resinous composition comprising (a) 15% to 40% by weight of an epoxidized ester of a neopentyl polyhydric alcohol containing from 3 to 8 hydroxyl groups per molecule and monocarboxylic acid where each of the hydroxyl groups of said neopentyl polyhydric alcohol has been replaced by the acid radical or said monocarboxylic acid, one of said monocarboxylic acid radicals being an aliphatic monocarboxylic acid radical containing from 4 to 22 carbon atoms and from 1 to 3 oxirane groups and the remainder of said monocarboxylic acid radicals being members selected from the group consisting of aliphatic monocarboxylic acid radicals containing from 4 to 22 carbon atoms and from 1 to 3 oxirane groups, aliphatic monocarboxylic acid radicals containing from 4 to 22 carbon atoms, benzenoid monocarboxylic acid radicals, and mixtures thereof, said epoxidized ester having an oxirane content of approximately 4.0% to 8.0%; (b) 5% to 30% by weight of a low molecular weight polyglycidyl ether which is the product of the condensation of epichlorohydrin with a polyhydric compound selected from the group consisting of polyhydric alcohols and polyhydric phenols, said ether having an average of 1.0 to 3.0 oxirane groups per molecule; (c) 20% to 50% by weight of an acidic ester that is the product of the reaction of a neopentyl polyhydric alcohol containing 3 to 6 hydroxyl groups per molecule with an anhydride of a polycarboxylic acid containing from 2 to 4 carboxyl groups, said acidic ester containing approximately one carboxyl group for each ester linkage; and (d) 10% to 50% by weight of a solvent for said acidic ester.

4. The cured resin that is the product obtained by heating at a temperature between 120° C. and 180° C. a resinous composition comprising (a) 15% to 40% by weight of an epoxidized tetraester of pentaerythritol and monocarboxylic acids, said monocarboxylic acids being selected from the group consisting of drying oil fatty acids, semi-drying oil fatty acids, and mixtures thereof, said epoxidized ester having an oxirane content of approximately 4.7% to 7.5%; (b) 5% to 30% by weight of a low molecular weight polyglycidyl ether which is the product of the condensation of epichlorohydrin with a polyhydric compound selected from the group consisting of polyhydric alcohols and polyhydric phenols, said ether having an average of 1.2 to 2.0 oxirane groups per molecule; (c) 20% to 50% by weight of an acidic ester that is the product of the reaction of pentaerythritol with an anhydride of a polycarboxylic acid containing from 2 to 4 carboxyl groups, said acidic ester containing approximately one carboxyl group for each ester linkage; and (d) 10% to 50% by weight of a solvent for said acidic ester.

5. The cured resin that is the product obtained by heating at a temperature between 120° C. and 180° C. a resinous composition comprising (a) 20% to 30% by weight of an epoxidized tall oil fatty acids tetraester of pentaerythritol, said ester having an oxirane content of 5.2% to 7.3%; (b) 10% to 20% by weight of a low molecular weight polyglycidyl ether which is the product of the condensation of epichlorohydrin with 2,2-bis(4-hydroxyphenyl)propane, said ether having an epoxide equivalent weight below approximately 800; (c) 25% to 45% by weight of a pentaerythritol tetra(acid ester) that is the product of the reaction of pentaerythritol with an anhydride of a polycarboxylic acid containing from 2 to 4 carboxyl groups; said (d) 20% to 40% by weight of a solvent for said acid ester.

6. The process of producing resinous products comprising the steps of forming a mixture comprising (a) 15% to 40% by weight of an epoxidized ester of a neopentyl polyhydric alcohol containing from 3 to 8 hydroxyl groups per molecule and monocarboxylic acid wherein each of the hydroxyl groups of said neopentyl polyhydric alcohol has been replaced by the acid radical of said monocarboxylic acid, one of said monocarboxylic acid radicals being an aliphatic monocarboxylic acid radical containing from 4 to 22 carbon atoms and from 1 to 3 oxirane groups and the remainder of said monocarboxylic acid radicals being members selected from the group consisting of aliphatic monocarboxylic acid radicals containing from 4 to 22 carbon atoms and from 1 to 3 oxirane groups, aliphatic monocarboxylic acid radicals containing from 4 to 22 carbon atoms, benzenoid monocarboxylic acid radicals, and mixtures thereof, said ester having an oxirane content of approximately 4.0% to 8.0%; (b) 5% to 30% by weight of a low molecular weight polyglycidyl ether which is the product of the condensation of epichlorohydrin with a polyhydric compound selected from the group consisting of polyhydric alcohols and polyhydric phenols, said ether having an average of 1.0 to 3.0 oxirane groups per molecule; (c) 20% to 50% by weight of an acidic ester that is the product of the reaction of a neopentyl polyhydric alcohol containing 3 to 6 hydroxyl groups per molecule with an anhydride of a polycarboxylic acid containing from 2 to 4 carboxyl groups, said acidic ester containing approximately 0.7 to 1.2 carboxyl groups for each ester linkage; and (d) 10% to 50% by weight of a solvent for said acidic ester, and thereafter curing said mixture at a temperature between 80° C. and 300° C.

7. The process of producing resinous products comprising the steps of forming a mixture comprising (a) 20% to 30% by weight of an epoxidized tetraester of pentaerythritol and monocarboxylic acids, said monocarboxylic acids being selected from the group consisting of drying oil fatty acids, semi-driving oil fatty acids, and mixtures thereof, said epoxidized ester having an oxirane content of approximately 4.7% to 7.5%; (b) 10% to 20% by weight of a low molecular weight polyglycidyl ether which is the product of the condensation of epichlorohydrin with 2,2-bis(4-hydroxyphenyl)-propane, said ether having an epoxide equivalent weight below approximately 800; (c) 25% to 45% by weight of an acidic ester that is the product of the reaction of pentaerythritol with an anhydride of a polycarboxylic acid containing from 2 to 4 carboxyl groups, said acidic ester containing approximately one carboxyl group for each ester linkage; and (d) 20% to 40% by weight of a solvent for said acidic ester, and thereafter curing said mixture at a temperature between 120° C. and 180° C.

8. The process of producing resinous products comprising the steps of forming an epoxide mixture containing 50% to 90% by weight of an epoxidized tetraester of pentaerythritol and monocarboxylic acids, said monocarboxylic acids being selected from the group consisting of drying oil fatty acids, semi-drying oil fatty acids, and mixtures thereof, said epoxidized ester having an oxirane content of approximately 4.7% to 7.5%, and 10% to 50% by weight of a low molecular weight polyglycidyl ether which is the product of the condensation of epichlorohydrin with a polyhydric compound selected from the group consisting of polyhydric alcohols and polyhydric phenols, said ether having an average of 1.0 to 3.0 oxirane groups per molecule, adding to said epoxide mixture a solution containing an acidic ester that is the product of the reaction of a neopentyl polyhydric alcohol containing 3 to 6 hydroxyl groups per molecule with an anhydride of a polycarboxylic acid containing from 2 to 4 carboxyl groups, said acidic ester containing approximately 0.7 to 1.2 carboxyl groups for each ester linkage, in a solvent for said acidic ester, to form a composition containing aproximately 0.5 to 1.5 equivalents of said acidic ester for each epoxide eqivalent of said epoxide mixture, and thereafter heating said composition at a temperature in the range of 80° C. to 300° C. to form a cured resinous product.

9. The process of producing resinous products comprising the steps of forming an epoxide mixture containing 60% to 75% by weight of an epoxidized tall oil fatty acids tetraester of pentaerythritol, said ester having an oxirane contents of 5.2% to 7.3%, and 25% to 40% by weight of a low molecular weight polyglycidyl ether which is the product of the condensation of epichlorohydrin with 2,2-bis(4-hydroxyphenyl)propane, said ether having an epoxide equivalent weight below approximately 800; adding to said epoxide mixture a solution containing an acidic ester that is the product of the reaction of pentaerythritol with an anhydride of a polycarboxylic acid containing from 2 to 4 carboxyl groups, said acidic ester containing approximately one carboxyl group for each ester linkage, in a solvent for said acidic ester to form a composition containing aproximately 1.0 equivalent of said acidic ester for each epoxide equivalent of said epoxide mixture, and thereafter heating said composition at a temperature in the range of 120° C. to 180° C. to form a cured resinous product.

10. The process of producing resinous products comprising the steps of forming an epoxide mixture containing 60% to 75% by weight of an epoxidized tall oil fatty acids tetraester of pentaerythritol, said epoxidized ester having an oxirane content of 5.2% to 7.3%, and 25% to 40% by weight of a low molecular weight polyglycidyl ether that is the product of the condensation of epichlorohydrin with 2,2-bis(4-hydroxyphenyl)propane, said ether having an epoxide equivalent weight below approximately 800, adding to said epoxide mixture a solution containing approximately 35% to 60% of pentaethritol terta(acid phthalate), to form a composition containing approximately 1.0 equivalent of said acid ester for each epoxide equivalent of said epoxide mixture, and thereafter heating said composition at a temperature in the range of 145° C. to 155° C. to form a cured resinous product.

References Cited by the Examiner

UNITED STATES PATENTS

| | | | |
|---|---|---|---|
| 2,682,514 | 6/1954 | Newey | 260—18 |
| 2,682,515 | 6/1954 | Naps | 260—18 |
| 2,824,083 | 2/1958 | Parry et al. | 260—47 |
| 2,935,492 | 5/1960 | Newey | 260—47 |
| 2,947,717 | 8/1960 | Belanger et al. | 260—47 XR |
| 2,993,920 | 7/1961 | Budde et al. | 260—18 XR |
| 3,012,485 | 12/1961 | Bradley | 260—47 XR |

LEON J. BERCOVITZ, *Primary Examiner.*

MILTON STERMAN, *Examiner.*